United States Patent
Costa et al.

[19]

[11] Patent Number: 6,126,128
[45] Date of Patent: Oct. 3, 2000

[54] ADJUSTABLE MOUNTING BRACKET

[75] Inventors: Richard Sander Costa, Bedminster; Daniel Plaza, Mendham, both of N.J.

[73] Assignee: Lucent Technologies Inc., Murray Hill, N.J.

[21] Appl. No.: 09/196,242

[22] Filed: Nov. 20, 1998

[51] Int. Cl.⁷ .................................................. E04G 3/00
[52] U.S. Cl. ............................ 248/278.1; 248/281.11
[58] Field of Search .................... 248/278.1, 276.1, 248/282.1, 323, 921, 917, 281.11; 312/245

[56] References Cited

U.S. PATENT DOCUMENTS

| | | | |
|---|---|---|---|
| 4,470,106 | 9/1984 | Norton | 248/278.1 |
| 4,489,910 | 12/1984 | Ferguson | 248/278.1 |
| 4,850,804 | 7/1989 | Huang | 248/278.1 |
| 4,887,784 | 12/1989 | Kayali | 248/278.1 |
| 5,853,158 | 12/1998 | Riggle | 248/278.1 |

*Primary Examiner*—Ramon O. Ramirez
*Assistant Examiner*—Jon A Szumny
*Attorney, Agent, or Firm*—Birch, Stewart, Kolasch & Birch, LLP

[57] ABSTRACT

A mounting bracket for attaching a cellular phone base station to a fixed object includes adjustment devices so that the base station may be accurately directed, or aimed, after installation. The bracket is C-shaped and provides a rigidifying skeletal frame for an electrical box housing the base station. By this arrangement, the box can be constructed relatively smaller and lighter than previously known boxes for such base stations. The bracket also includes structural features which cooperate with the box to enable the box to be installed by a single service technician.

16 Claims, 6 Drawing Sheets

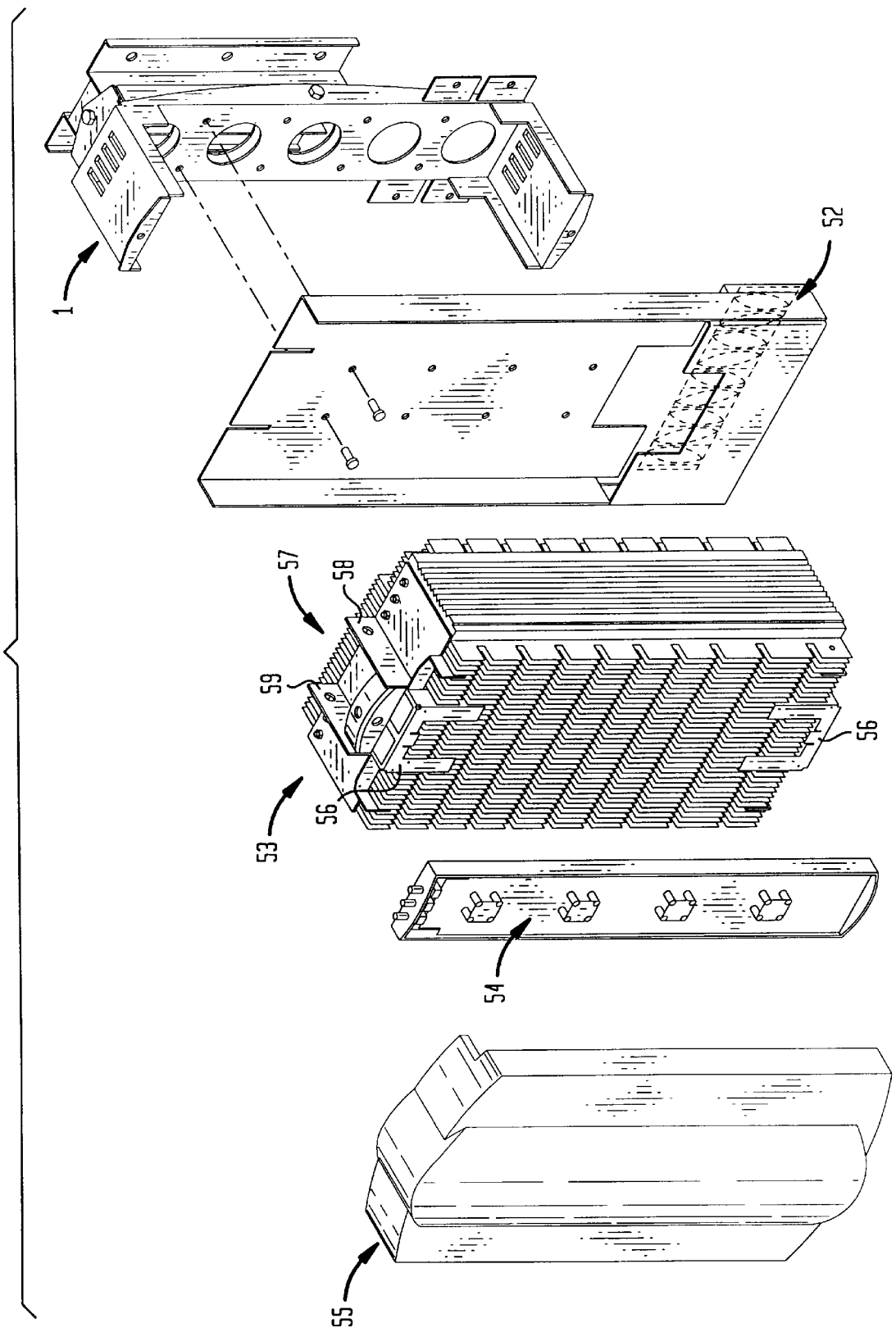

ADJUSTABLE MOUNTING BRACKET

BACKGROUND OF THE INVENTION

1. Field of the Invention

The present invention relates to an adjustable mounting bracket for attaching one object to another object. More specifically, the present invention relates to a mounting bracket for attaching a cellular phone base station to a fixed structure, and for allowing the base station to be oriented to a desired position relative to the fixed structure.

2. Description of the Background Art

Cellular phones have become an indispensable form of communication in today's society. Many businesses rely upon this wireless technology to keep in constant communication with employ outside the office. Also, cellular phones are a great convenience to our personal lives. To this end, cellular phone service providers have established wide areas of coverage where cellular phones can be operated.

These areas of coverage are usually concentrated in areas having dense populations, for example cities, suburbs, and interstate highways. Unfortunately, the areas with dense populations often have manmade structures which act as barriers to the coverage areas. Obstacles, such as tunnels and closely-knit skyscrapers, can create areas of reduced signal strength within the coverage area. These reduced signal strength areas are often referred to as dark zones.

Cellular phone users can be greatly inconvenienced by these dark zones. For instance, the cellular phone user may be unable to place a call, or may have an active call dropped when passing through a dark zone. Adding to the inconvenience is the fact that these dark zones can occur in the very heart of the intended coverage area.

Because of these inconveniences, the cellular phone service provides have undertaken to install supplemental cellular phone base stations, or patch stations, in the dark zones. The base station is physically connected to a fixed structure adjacent the dark zone, such as a building, bridge or tunnel. Next, the base station is connected into the cellular phone service system. The addition of these supplemental base stations brightens the dark zone, so that cellular service customers can enjoy uninterrupted service.

The supplemental base station has traditionally been housed within a rather bulky box. The box housed many pounds of electrical components necessary to the base station's functions. In order to shield the electrical components, provide adequate heat dissipation, and simply support the electrical components, the box had to be formed of a rigidified material, typically aluminum. The bulkiness of the box thereby even further added to the overall weight of the base station.

During installation, two and sometime three phone service technicians were required to position the heavy base station relative to the fixed structure, such as a wall or utility pole. While the service technicians were holding the base station, another technician would attach fasteners between the base station and the fixed structure.

It should also be noted that the base station had to be aimed into an optimum area of the dark zone. To accomplish this one of two alternatives occurs. First, it was possible to align the base station to the proper horizontal and vertical angles while attaching it to the fixed structure. A second alternative was to provide a directional antenna on the exterior of the base station which could be aimed as desired. Such an antenna would have to have its own independent weather resistant housing.

Accordingly, there exists a need in the art for a mounting bracket which simplifies the installation process for mounting a cellular phone service base station to a fixed structure. There also exists the continual need in the art to provide smaller and lighter weight systems capable performing as well, or better than, their ancestral systems.

SUMMARY OF THE INVENTION

Accordingly, it is a primary object of the present invention to provide a mounting bracket which simplifies the installation process of attaching a cellular phone service base station to a fixed structure. To this end, the present invention makes it possible for a single service technician to install the base station without resorting to the assistance of others in holding or operating the fasteners of the mounting bracket.

Another object of the present invention is to provide a mounting bracket which allows for accurate and secure sighting, or alignment, of the base station into the optimum area of the dark zone.

Yet another object of the present invention is to provide a mounting bracket which provides rigidity to the housing of the base station. To this end, the housing of the base station can be reduced in size and lighter in weight than previous housings, yet retain the advantages of the larger housings.

These and other objects of the present invention are fulfilled by providing a mounting assembly for attaching a housing to a structure, said mounting assembly comprising: a first bracket for attachment to the structure; a second bracket attached to said first bracket by at least one first pivotable connection to allow said second bracket to pivot about a first axis relative to said first bracket; and a third bracket attached to said second bracket by at least one second pivotable connection to allow said third bracket to pivot about a second axis relative to said second bracket, wherein said second axis is orthogonal to said first axis.

Moreover, these and other objects of the present invention are fulfilled by providing a combination of a mounting assembly and a housing for attachment to a structure, said combination comprising a first bracket for attachment to the structure; a second bracket attached to said first bracket by at least one first pivotable connection to allow said second bracket to pivot about a first axis relative to said first bracket; a third bracket attached to said second bracket by at least one second pivotable connection to allow said third bracket to pivot about a second axis relative to said second bracket, wherein said second axis is orthogonal to said first axis with said third bracket including a first member extending in a first direction and having a first and second end along said first direction, a second member connected to said first member at said first end and forming an angle with said first member, and a third member connected to said first member at said second end and forming an angle with said first member; a housing having a top and a bottom; a first channel formed on said top of said housing; and a second channel formed on said bottom of said housing, wherein said second member is adapted to slidingly engage with said first channel and said third member is adapted to slidingly engage with said second channel.

Furthermore, these and other objects are fulfilled by a method installing a housing to a structure, said method comprising: providing a first bracket for attachment to the structure; providing a second bracket attached to the first bracket by at least one first pivotable connection to allow the second bracket to pivot about a first axis relative to the first bracket; providing a third bracket attached to the second bracket by at least one second pivotable connection to allow the third bracket to pivot about a second axis relative to the second bracket, wherein the second axis is orthogonal to the first axis with the third bracket including a first member extending in a first direction and having a first and second end along the first direction, a second member connected to the first member at the first end and forming an angle with the first member, and a third member connected to the first member at the second end and forming an angle with the first member; providing a housing having a top and a bottom; providing a first channel formed on the top of the housing; providing a second channel formed on the bottom of the housing; engaging the third member in the second channel; engaging the second member in the first channel; sliding the housing toward the first member with the third member engaged in the second channel and the second member engaged in the first channel; and attaching the housing to at least one of the first, second and third members.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is an exploded view illustrating the connections between an antenna, a base station and the adjustable mounting assembly.

DETAILED DESCRIPTION OF THE PREFERRED EMBODIMENTS

Figure 1:
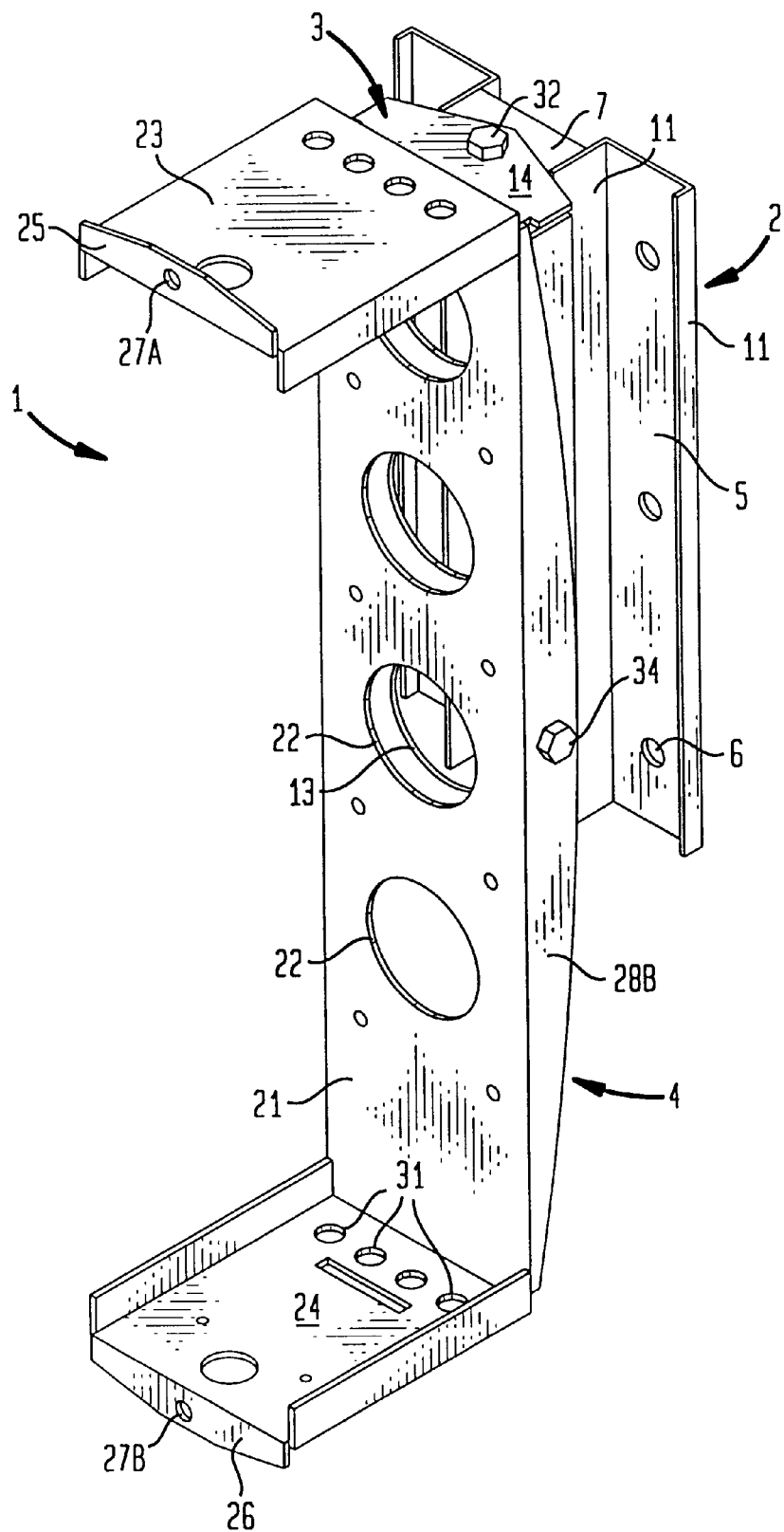
FIG. 1 is a front left-side, perspective view of an adjustable mounting assembly, in accordance with the present invention.
Figure 2:
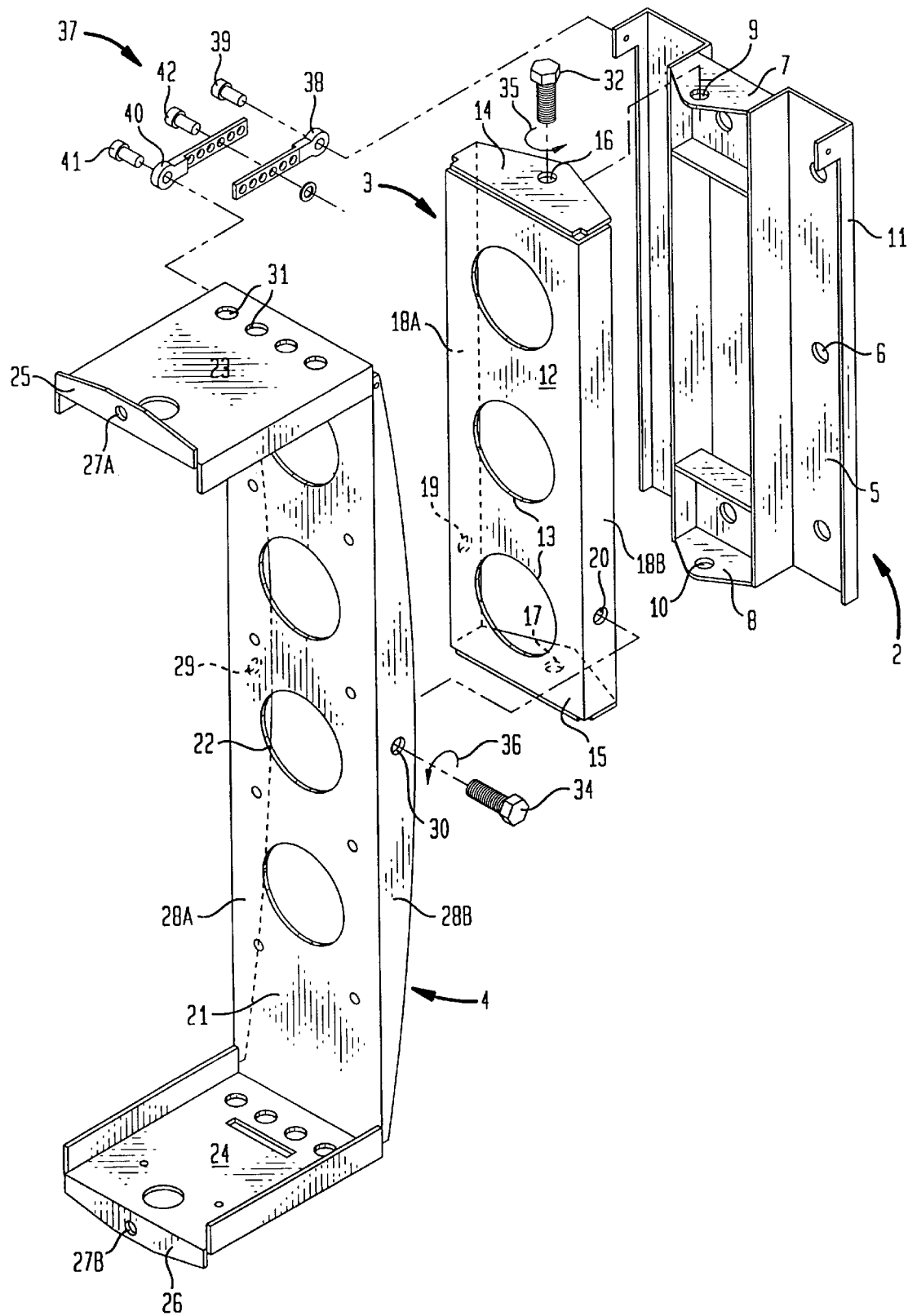
FIG. 2 is a front left-side, exploded view of the adjustable mounting assembly of FIG. 1.

Referring in detail to the drawings and with particular reference to FIGS. 1 and 2, an adjustable mounting assembly 1, in accordance with the present invention, includes a first bracket 2, a second bracket 3 and a third bracket 4.

The first bracket 2 includes a generally planar, first base 5 having a plurality of mounting holes 6 therein. An upper first tab 7 and a lower first tab 8 are provided on distal ends of the first base 5. The upper and lower first tabs 7 and 8 each include respective through holes 9 and 10.

The side edges of the first base 5 and center sections thereof may include ribs 11. Ribs 11 will add structural stability to the first bracket 2, and will afford additional surfaces through which mounting holes 6 may be formed. Additional mounting holes 6 will allow versatility to the different ways the first bracket 2 can be mounted to a stationary structure, as will be described in more detail with reference to FIGS. 4 and 5, hereinafter.

The second bracket 3 includes a generally planar, second base 12. Cutout holes 13 can be formed in the second base 12. The cutout holes 13 reduce the overall weight of the mounting assembly 1, and provide access to the inner features of the mounting assembly 1 to facilitate inspection, cleaning, adjustment and/or repair. An upper second tab 14 and a lower second tab 15 are provided on distal ends of the second base 12. The upper and lower second tabs 14 and 15 each include respective through holes 16 and 17.

The side edges of the second base include right and left ribs 18A and 18B, respectively. A right through hole 19 is provided in the right rib 18A, and a left through hole 20 is provided in the left rib 18B. The right and left through holes 19 and 20 are used in conjunction with the third bracket 4, as will be later described.

The third bracket 4 includes a generally planar, third base 21. Cutout holes 22 can be formed in the third base 21. The cutout holes 22 reduce the overall weight of the mounting assembly 1, and cooperate with the cutout holes 13 to provide access to the inner features of the mounting assembly 1. A first member 23 and a second member 24 are provided on distal ends of the third base 21. The first and second members 23 and 24 extend perpendicularly away from the third base 21 at approximately ninety degree angles.

A first flange 25 is provided at an end of the first member 23 remote from the connection between the third base 21 and the first member 23. A second flange 26 is provided at an end of the second member 24 remote from the connection between the third base 21 and the second member 24. The first flange 25 includes a hole 27A with internal threading. The second flange 26 includes a hole 27B with internal threading.

The sides of the third base 21 include right and left ribs 28A, 28B. The right rib 28A includes a through hole 29. The left rib 28B includes a through hole 30, which is aligned with the through hole 29. Also, the first and second members 23, 24 may include openings 31 in the form of circular though holes, elongated slots, or other shapes.

Now, the physical connections between the first, second and third brackets 2, 3, 4 will be described with reference to FIG. 2. The first bracket 2 is connected to the second bracket 3 by first and second bolts. Only the first bolt 32 has been illustrated in order to simplify the drawings. During assembly, the through holes 9 and 16 of the upper first and second tabs 7 and 14, respectively, are aligned. Also, the through holes 10 and 17 of the lower first and second tabs 8 and 15, respectively, are aligned. The first bolt 32 is inserted through the aligned through holes 9 and 16, and the second bolt is inserted through the aligned through holes 10 and 17. Nuts, flat washers, and lock washers may be employed to secure the first and second bolts.

The third bracket 4 is connected to the second bracket 3 via aligning the through holes 19, 20, 29, 30. A third bolt 33 is inserted through the holes 19, 29. A fourth bolt 34 is inserted through the holes 20, 30. Again, nuts, flat washers, and lock washers may be employed to secure the third and fourth bolts.

Figure 5:
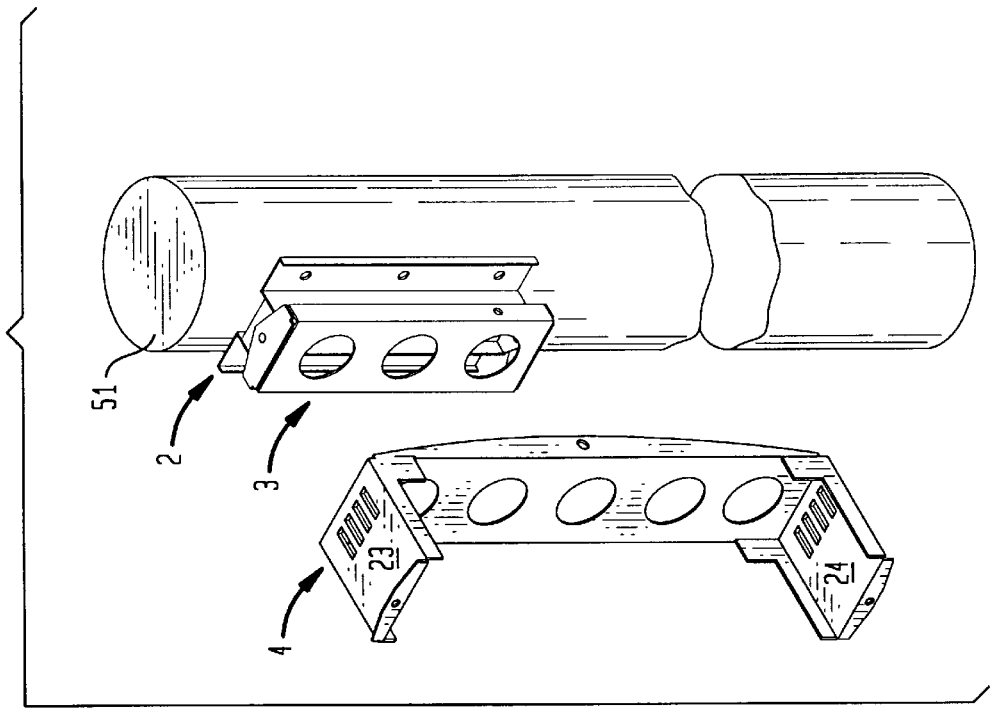
FIG. 5 is a perspective view of the adjustable mounting assembly aligned for connection to a utility pole.

In operation, the first bracket 2 is connected to a solid structure, such as a wall (FIG. 4) or a utility pole (FIG. 5).

When the first and second bolts are loosened and the first and second members 23, 24 are grasped, the third bracket 4 may be pivoted to the right and left about a vertical axis 35. Once a desired positioning of the third bracket 4 is achieved, the first and second nuts are tightened and the right-left positioning is thereby locked. When the third and fourth bolts 33, 34 are loosened and the first and second members 23, 24 are grasped, the third bracket 4 may be pivoted about a horizontal axis 36. Once a desired positioning of the third bracket 4 is achieved, the third and fourth bolts 33, 34 are tightened and the up-down positioning is thereby locked.

If the mounting assembly 1 is to support a heavy load, the locking force of the third and fourth bolts 33, 34 must be supplemented. To this end, a locking peg strip arrangement 37 may be employed. A first strip 38 is rotatably connected to a rib of the first mounting bracket 2 via a pivot pin 39. A second strip 40 is rotatably connected the right rib 28A of the third bracket 4 via a pivot pin 41. Once the desired angle of the third bracket 4 is set about the horizontal axis 36, a locking pin 42 is inserted through aligned holes of the first and second strips 38, 40.

Figure 3:
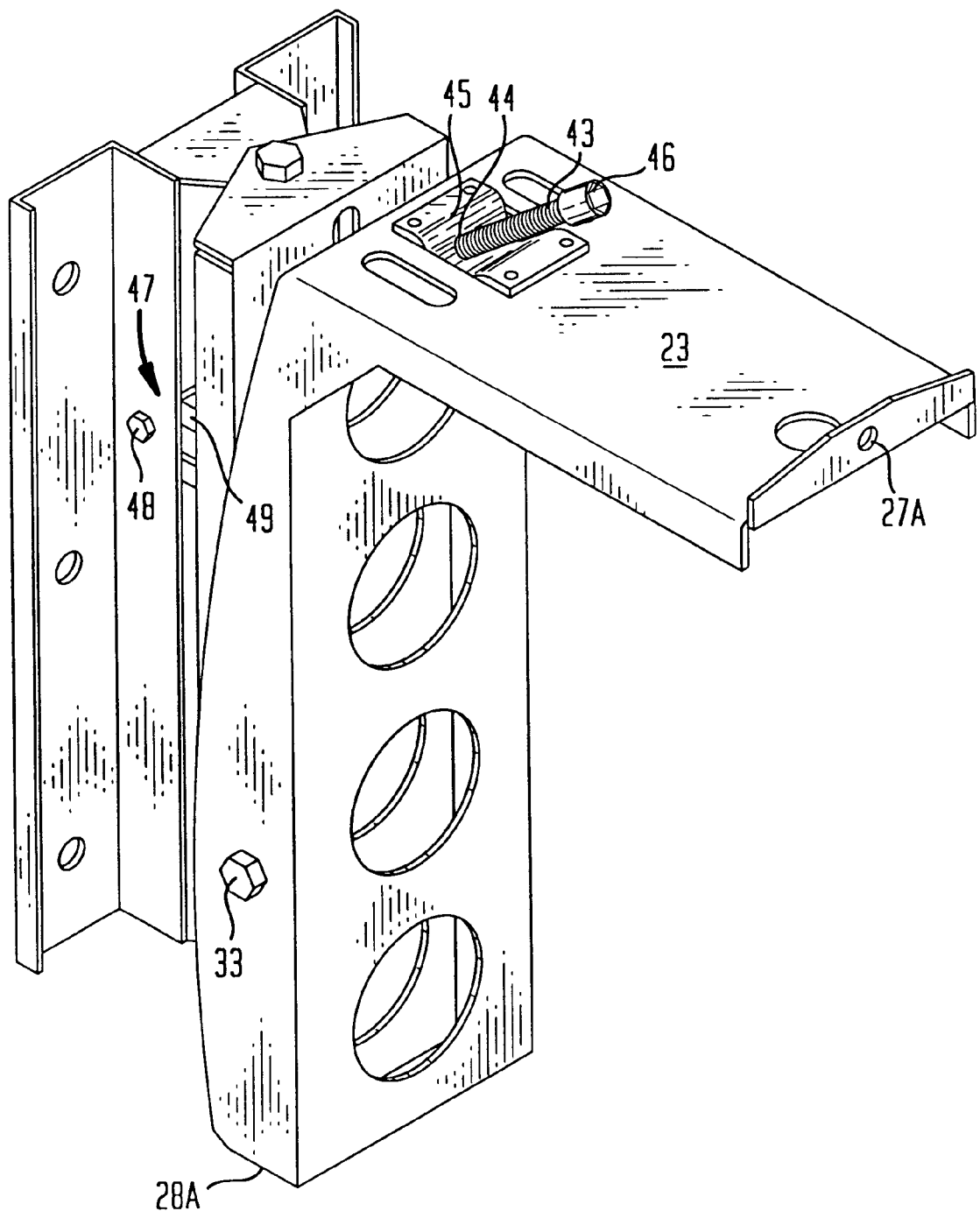
FIG. 3 is a right-side, perspective view of the adjustable mounting assembly with a threaded vertical tilt adjuster.

FIG. 3 illustrates an alternative supplemental locking arrangement for the up-down positioning of the third bracket 4. In this embodiment, a first adjustment screw 43 is threaded into a threaded hole 44 formed in the first member 23. The threaded hole 44 is formed on a canted surface 45 extending downwardly from the first member 23 toward the horizontal axis 36. One end of the first adjustment screw 43 includes a drive head 46, for engaging with a tool. The other end of the first adjustment screw 43 is not threaded, but rather is captured inside, and allowed to freely rotate within, an opening formed in a pivoting plate attached to the first bracket 2 or the second bracket 3.

By the alternative embodiment, the third bracket 4 may be rotated about the horizontal axis 36 and locked in any desired up-down position by rotating the first adjustment screw 43. Also with this embodiment, it is possible to replace, instead of supplement, the third and fourth bolts 33, 34 with simple pivoting pins, since the first adjustment screw 43 can completely support the weight of the third bracket 4 and the object contained therein.

Also illustrated in FIG. 3 is an adjustment mechanism 47 for rotating the second bracket 3 about the vertical axis 35 relative to the first bracket 2. The adjustment mechanism 47 includes a second adjustment screw 48 which extends through a non-threaded hole formed in one of the internal ribs 11 of the first bracket 2.

A block 49 is attached to the back of the second base 12 of the second bracket 3. Inside the block 49 is a freely pivotable plate having a threaded hole therein. The second adjustment screw 48 is linearly captured, but allowed to freely rotate, within the non-threaded hole formed in the internal rib 11. The rest of the second adjustment screw 48 is threaded. This threaded portion of the second adjustment screw 48 is threaded into the threaded hole in the plate within the block 49. Rotation of the second adjustment screw 48 results in near linear movement of the block 49 relative to the first bracket 2, which in turn results in rotation of the second bracket 3 about the vertical axis 35 relative to the first bracket 2.

By the above arrangement, the right-left positioning of the third bracket 4 can be easily and accurately controlled. Also, it is possible to replace, instead of supplement, the first bolt 32 and second bolt with simple pivot pin pins, since the second adjustment screw will adequately hold the desired right-left positioning of the third bracket 4.

Figure 4:
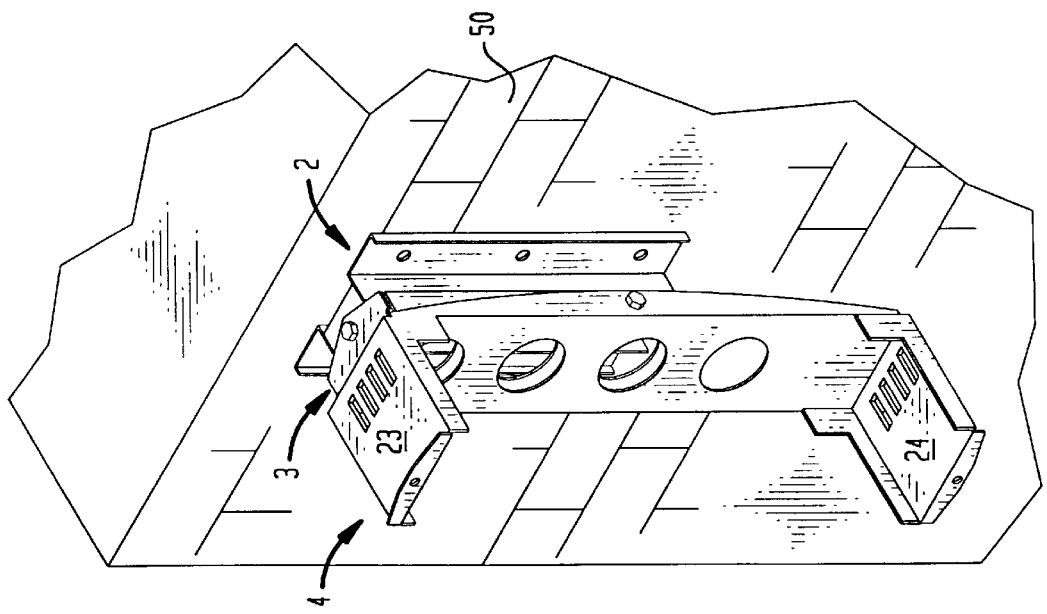
FIG. 4 is a perspective view of the adjustable mounting assembly connected to a wall.

FIGS. 4 and 5 illustrate the versatility of the mounting assembly 1. In FIG. 4, the first bracket 2 is connected to a wall 50. In FIG. 5, the first bracket 2 is connected to a utility pole 51. Of course, it is envisioned that the first bracket 2 may be modified. For example, the first base 5 could be curved so as to match the contour of the surface upon which the first bracket 2 is mounted. Also, additional or different mounting holes could be formed in the first base 5 to optimize the integrity of the mounting.

FIG. 6 is an exploded view illustrating the mounting assembly 1 in combination with a cellular phone base station. The cellular phone base station includes a baffle fan assembly 52, a housing 53, a directional antenna 54, and a solar shield 55. When assembled, the directional antenna 54 is attached to supports 56 fixed to the housing 53 and the solar shield 55 is fitted to the directional antenna 54.

Figure 7:
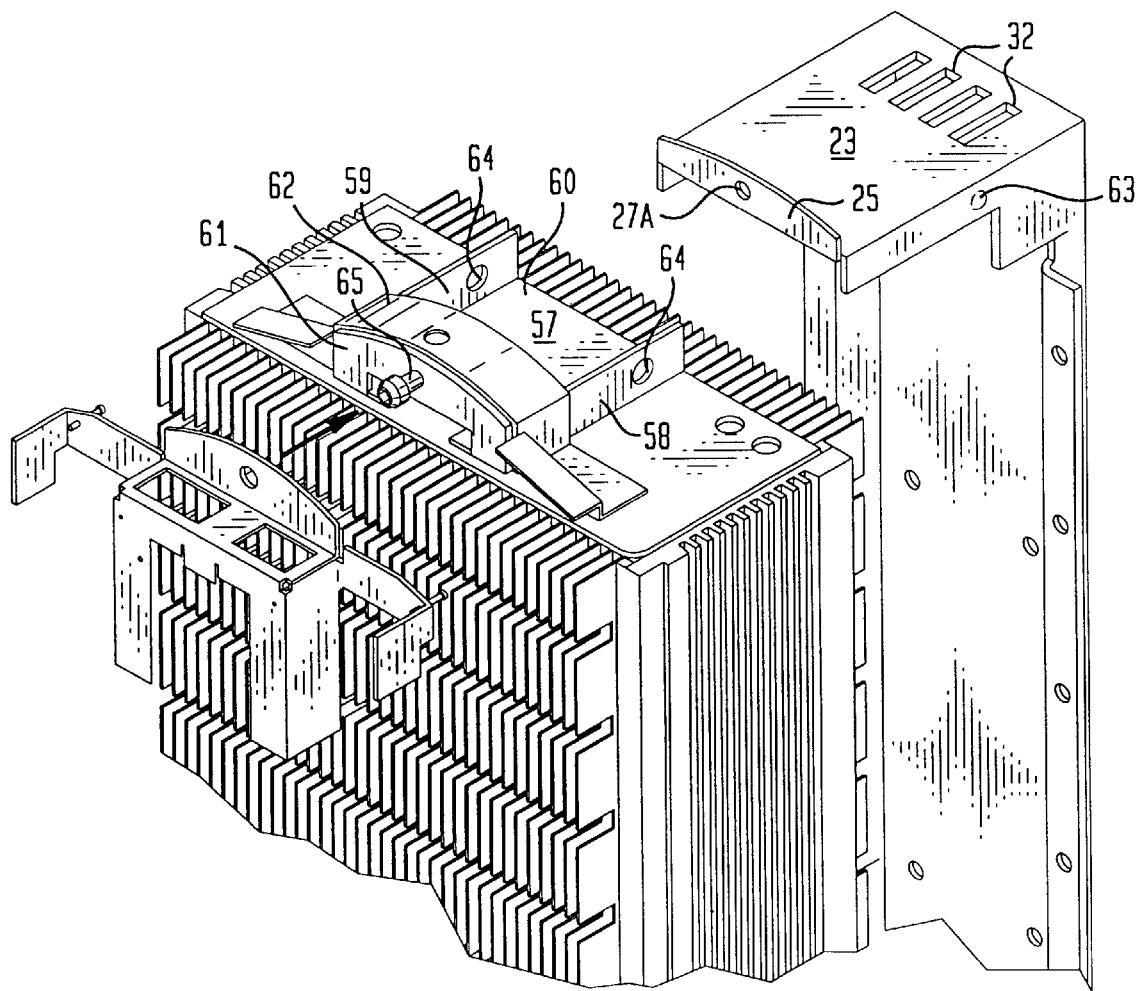
FIG. 7 is close up perspective view illustrating a keying feature between the adjustable mounting assembly and a channel formed on the top of the base station.

The housing 53 is formed of an aluminum material and includes a plurality of heat sinks on its outer surface. The upper surface of the housing 53 includes a first channel 57 formed between two upstanding ears 58 and 59. As illustrated in FIG. 7, a rear end 60 of the first channel 57 is open. A front end of the first channel 57 is closed by a first stop plate 61. The two upstanding ears 58 and 59 are joined to one another, adjacent the stop plate 61, by a first hood 62. The first hood 62 is used as a handle by a service technician when carrying the housing 53. The lower surface of the housing 53 is a mirror image of the upper surface. Therefore, the lower surface includes a second channel formed between two ears, a second stop plate, and a second hood, which are not illustrated in FIG. 7 in order to simplify FIG. 7.

To attach the cellular phone base station to the mounting assembly 1 the service technician picks the housing 53 up by the first hood 62 and second hood (not shown). Next, the first member 23 is engaged within the first channel 57 and the second member 24 is engaged within the second channel (not shown). The spacing between the first member 23 and the second member 24 is nearly equal to the height of the housing 53 as measured from the upper surface to the lower surface. Therefore, the engagement of the first and second members 23, 24 into the channels occurs almost simultaneously.

Next, the housing 53 is slid toward the third base 21 of the third bracket 4, until the first flange 25 abuts the first stop plate 61 and the second flange 26 abuts the second stop plate (not shown). As illustrated in FIG. 7, when the flanges 25, 26 abut the stop plates 61, two bubbled portions 63 formed on the first member 23 will snap into two openings 64 formed in the upstanding ears 58, 59. It is also foreseeable that bubbled portions formed on the second member 24 would snap into openings formed in the ears of the second channel (not shown) on the lower surface of the housing 53. The snap fit of the bubbled portion 63 causes the housing 53 to be temporarily secured to the mounting assembly 1 so that the service technician can release the housing 53.

The stop plates 61 of the housing 53 each include a captured locking screw 65. Each locking screw 65 is sized to thread into the first and second threaded holes 27A, 27B of the first and second members 23, 24, respectively. To firmly secure the housing 53 to the mounting assembly 1, the service technician tightens the locking screws 65 using a tool. For more detail concerning the locking screw 65 and its interaction between with the housing, a door of the housing, a gasket for the door, and the mounting assembly, reference should be made to the commonly assigned application entitled "Fastener with Alignment and Spacing Features," which was filed concurrently with the present application, the contents of which are hereby incorporated by reference.

Once the cellular phone base station is secured to the mounting assembly 1, the service technician can adjust the orientation, or bore sighting, of the directional antenna 54 using the adjustment features of the mounting assembly 1, detailed above. By rotating the third bracket 4 about the vertical axis 35 and the horizontal axis 36, the direction antenna 54 can be aimed at an optimum point in order to provide maximum signal propagation within the dark zone.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An adjustable mounting assembly for attaching a housing to a structure, said mounting assembly comprising:
    a first bracket for attachment to the structure;
    a second bracket attached to said first bracket by at least one first pivotable connection to allow said second bracket to pivot about a first axis relative to said first bracket; and
    a third bracket attached to said second bracket by at least one second pivotable connection to allow said third bracket to pivot about a second axis relative to said second bracket, wherein said second axis is orthogonal to said first axis and said third bracket includes a base having a first and second end, a first member connected to said base at said first end and forming approximately a ninety degree angle with said base, and a second member connected to said base at said second end and forming approximately a ninety degree angle with said base, and said first member includes a first flange with a first attachment device formed therein, said first flange being formed on an end of said first member distal to the connection between said base and said first member.

2. The mounting assembly according to claim 1, wherein said first bracket extends in a first direction and said at least one first pivotable connection includes two first pivotable connections spaced from one another in said first direction.

3. The mounting assembly according to claim 2, wherein said second bracket extends in said first direction and said at least one second pivotable connection includes two second pivotable connections spaced from one another in a second direction orthogonal to said first direction.

4. The mounting assembly according to claim 1, wherein said second member includes a second flange with a second attachment device formed therein, said second flange being formed on an end of said second member distal to the connection between said base and said second member.

5. The mounting assembly according to claim 4, wherein said first and second attachment devices are threaded holes bored into said first and second flanges, respectively.

6. The mounting assembly according to claim 1, further comprising:
    a bolt provided along said first axis, and wherein tightening of said bolt locks said second bracket to said first bracket to prevent pivoting about said first axis.

7. A combination of a mounting assembly and a housing for attachment to a structure, said combination comprising:
    a first bracket for attachment to the structure;
    a second bracket attached to said first bracket by at least one first pivotable connection to allow said second bracket to pivot about a first axis relative to said first bracket;
    a third bracket attached to said second bracket by at least one second pivotable connection to allow said third bracket to pivot about a second axis relative to said second bracket, wherein said second axis is orthogonal to said first axis, with said third bracket including a base having a first and second ends, a first member connected to said base at said first end and forming an angle with said base, and a second member connected to said base at said second end and forming an angle with said base;
    a housing having a top and a bottom;
    a first channel formed on said top of said housing; and
    a second channel formed on said bottom of said housing, wherein said first member is adapted to slidingly engage with said first channel and said second member is adapted to slidingly engage with said second channel.

8. The combination according to claim 7, wherein said first member includes a first flange with a first attachment device formed therein, said first flange being formed on an end of said first member distal to the connection between said base and said first member, and said housing includes a first lip extending from said top for abutting said first flange.

9. The combination according to claim 8, wherein said first attachment device is a first threaded hole bored into said first flange, and further comprising:
    a first through hole formed in said first lip; and
    a first threaded fastener having a first head bearing against said first lip and a first threaded shaft engaged in said first threaded hole.

10. The combination according to claim 9, wherein said second member includes a second flange with a second attachment device formed therein, said second flange being formed on an end of said second member distal to the connection between said base and said second member, and said housing includes a second lip extending from said bottom for abutting said second flange.

11. The combination according to claim 10, wherein said second attachment device is a second threaded hole bored into said second flange, and further comprising:
    a second through hole formed in said second lip; and
    a second threaded fastener having a second head bearing against said second lip and a second threaded shaft engaged in said second threaded hole.

12. The combination according to claim 7, further comprising:
    a hood enclosing a portion of said first channel, said hood acting as a handle to permit carrying of said housing.

13. The combination according to claim 7 further comprising:
    electrical components and an antenna for establishing cellular communications housed within or attached to said housing.

14. A method of installing a housing to a structure, said method comprising:
    providing a first bracket for attachment to the structure;
    providing a second bracket attached to the first bracket by at least one first pivotable connection to allow the second bracket to pivot about a first axis relative to the first bracket;
    providing a third bracket attached to the second bracket by at least one second pivotable connection to allow the third bracket to pivot about a second axis relative to the second bracket, wherein the second axis is orthogonal to the first axis, with the third bracket including a base extending in a first direction and having a first and second end along the first direction, a first member connected to the base at the first end and forming an angle with the first member, and a second member connected to the base at the second end and forming an angle with the base;

providing a housing having a top and a bottom;

providing a first channel formed on the top of the housing;

providing a second channel formed on the bottom of the housing;

engaging the first member in the first channel;

engaging the second member in the second channel;

sliding the housing toward the base with the first member engaged in the first channel and the second member engaged in the second channel; and attaching the housing to at least one of the base, first member, and second member.

15. The method according to claim 14, further comprising the steps of:

pivoting the second bracket about the first axis relative to the first bracket; and pivoting the third bracket about the second axis relative to the second bracket, to thereby direct the housing in a desired orientation.

16. The method according to claim 14, wherein said step of attaching the housing to at least one of the base, first member, and second member includes:

providing two threaded members, two through holes in the housing, and two threaded holes in the first and second members; and connecting the housing to the first and second members by inserting the two threaded members through the two through holes and into the two threaded holes.

\* \* \* \* \*